United States Patent
Haas et al.

(10) Patent No.: US 10,647,209 B2
(45) Date of Patent: May 12, 2020

(54) MANAGING AND OPTIMIZING ENERGY SUPPLY FROM GRID AND RENEWABLE SOURCE WITH ELECTRIC VEHICLE SUPPLY EQUIPMENT

(71) Applicant: SIEMENS INDUSTRY, INC., Alpharetta, GA (US)

(72) Inventors: Harry Price Haas, Atlanta, GA (US); Sesha Devasena Yeruva, Duluth, GA (US); Celia Dayagi, Atlanta, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 920 days.

(21) Appl. No.: 14/867,309

(22) Filed: Sep. 28, 2015

(65) Prior Publication Data

US 2017/0088001 A1  Mar. 30, 2017

(51) Int. Cl.
| | | |
|---|---|---|
| B60L 53/63 | (2019.01) | |
| B60L 11/18 | (2006.01) | |
| B60L 53/64 | (2019.01) | |
| B60L 53/14 | (2019.01) | |
| B60L 53/60 | (2019.01) | |

(52) U.S. Cl.
CPC ........... *B60L 11/1844* (2013.01); *B60L 53/14* (2019.02); *B60L 53/60* (2019.02); *B60L 53/63* (2019.02); *B60L 53/64* (2019.02); *B60L 2240/80* (2013.01); *Y02E 60/721* (2013.01); *Y02T 10/7005* (2013.01); *Y02T 10/7072* (2013.01); *Y02T 10/7094* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
None
See application file for complete search history.

(56) References Cited

U.S. PATENT DOCUMENTS

| | | | | |
|---|---|---|---|---|
| 6,285,178 | B1* | 9/2001 | Ball | H02J 3/005 318/137 |
| 2005/0154499 | A1* | 7/2005 | Aldridge | F02G 1/043 700/286 |
| 2007/0010916 | A1* | 1/2007 | Rodgers | H02J 3/14 700/295 |
| 2011/0077809 | A1* | 3/2011 | Leary | B60L 11/1824 701/22 |
| 2013/0021162 | A1* | 1/2013 | DeBoer | B60L 11/1824 340/635 |

(Continued)

*Primary Examiner* — Robert Grant
*Assistant Examiner* — Tynese V McDaniel (57) ABSTRACT

An electric vehicle supply equipment (EVSE) charging system includes an EVSE charging station that is configured to switch a power source between a first power source and a second power source based on a time of use or real-time energy pricing data from a utility. Switching additionally and/or optionally may be based on at least one of charging information and metering information. The first power source may be a renewable source and the second source may be the power grid. In this way, a smart electric vehicle supply equipment (EVSE) charging station may manage and optimize energy supply from a grid and a renewable source when charging an electric vehicle (EV) with the smart the EVSE charging station.

16 Claims, 5 Drawing Sheets

(56) References Cited

U.S. PATENT DOCUMENTS

| | | | |
|---|---|---|---|
| 2013/0141040 A1* | 6/2013 | DeBoer | B60L 11/1838 320/109 |
| 2013/0211988 A1* | 8/2013 | Dorn | B60L 11/1838 705/35 |
| 2015/0165915 A1* | 6/2015 | Cun | H02J 7/35 320/101 |
| 2016/0334848 A1* | 11/2016 | Carlson | G06F 1/28 |

* cited by examiner

MANAGING AND OPTIMIZING ENERGY SUPPLY FROM GRID AND RENEWABLE SOURCE WITH ELECTRIC VEHICLE SUPPLY EQUIPMENT

BACKGROUND

1. Field

Aspects of the present invention generally relate to electric vehicles and more specifically relates to smart electrical charging stations or systems for charging electric vehicles.

2. Description of the Related Art

With the advent of high fuel prices, the automotive industry has reacted with a selection of Electric Vehicles (EVs). Such EVs are propelled by an electric motor (or motors) that are powered by rechargeable power sources (e.g., battery packs). EVs include both full electric and hybrid electric vehicles. Electric motors have several advantages over internal combustion engines. For example, electric motors may convert about 75% of the chemical energy from the batteries to power the wheels, whereas internal combustion engines (ICES) may only convert only about 20% of the energy stored in gasoline. EVs emit no tailpipe pollutants when operating in battery mode, although the power plant producing the electricity may emit them. Electric motors provide quiet, smooth operation, strong acceleration and require relatively low maintenance. However, most EVs can only go about 100-200 miles before requiring recharging. Fully recharging an EV's battery pack may take about 4 to 8 hours. Even a quick charge to about 80% capacity can take about 30 minutes. Furthermore, as battery pack size increases, so does the corresponding charging time. EV charging may take place at the owner's residence using an electric vehicle recharging station, referred to herein as an electric vehicle supply equipment (EVSE). Such EVSEs are typically installed at the residence (e.g., in a garage), and are electrically coupled to the electrical load center for the residence.

Increase in electric vehicles (EVs) puts a tremendous burden on the grid and results in higher energy costs for the user, especially during peak hours. This increase is demand at intermittent points on the grid also potentially causes grid stability issues. Using solar power harvested during day to charge an electric vehicle (EV) can take the load off the grid. However, utilizing solar power or another renewable source alone to charge the EV cannot provide an uninterrupted supply for charging the EV.

Increased demand on the grid is handled by demand response programs of a utility provider. They attempt to limit peak demand, which restricts a user to certain periods of the day for charging. Using renewable sources for charging has issues. For example, solar-powered electric vehicle (EV) charging stations with a backup system can provide a constant supply to the electric vehicle (EV) to only a certain extent. That is, supply from renewable sources is not continuous and abundant at this point.

Therefore, there is a need for improvements to EVSE systems, such as residential EVSE systems including EVSE charging stations configured to electrically connect to an EV.

SUMMARY

Briefly described, aspects of the present invention relate to a smart electric vehicle power supply and charging system that manages and optimizes energy supply from a grid and a renewable source using a smart electric vehicle supply equipment (EVSE). In particular, when charging an electric vehicle (EV) an electric vehicle supply equipment (EVSE) charging station controls switching between a first power source and a second power source to the EV based on a time of use or real-time energy pricing data received from a utility and optionally based on at least one of charging information and metering information. One of ordinary skill in the art appreciates that such an electric vehicle charging system can be configured to be installed in different environments where electric vehicle charging is needed, for example, in residential electric vehicle charging systems to manage and optimize energy supply from a grid and a renewable source to an electric vehicle (EV).

In accordance with one illustrative embodiment of the present invention, an electrical supply system for an electric vehicle (EV) is provided. The system comprises an electric vehicle supply equipment (EVSE) charging station including a meter, a switch, a controller and a wireless communication unit. The EVSE charging station is configured to couple to the EV for electrically charging a battery of the EV. The wireless communication unit is configured to communicate with a wireless communication device that is configured to communicate with an EVSE server and a utility server. The EVSE server is configured to communicate with a user communication device. The meter is operable to receive charging information from one or more sources and provide metering information of a first power source and a second power source by measuring values of at least one of charge current and charge voltage and calculate one or more energy usage parameters including charge power usage or charge energy usage from the measured values of charge current and/or charge voltage. The switch is configured to couple to the first power source and the second power source. The first power source to receive energy from a renewable power source to charge the battery of the EV and the second power source to receive energy from a power grid to charge the battery of the EV. The switch is operable to switch between the first power source and the second power source. The controller is configured to control the switch by switching between the first power source and the second power source based on a time of use or real-time energy pricing data from a utility and optionally based on at least one of the charging information and the metering information.

In accordance with another illustrative embodiment of the present invention, a method of supplying power to an electric vehicle (EV) is provided. The method comprises providing an electric vehicle supply equipment (EVSE) charging station for electrically charging a battery of the EV, coupling a switch to a first power source and a second power source, the first power source to receive energy from a renewable power source to charge the battery of the EV and the second power source to receive energy from a power grid to charge the battery of the EV, providing electricity to the EVSE charging station from a load center, a power supplier coupled to the load center, the load center coupled to the EVSE charging station, a smart meter device coupled to the load center, wherein the smart meter device including a communication capability adapted to communicate with the EVSE charging station, the smart meter device coupled to the power grid and controlling the switch for switching between the first power source and the second power source based on a time of use or real-time energy pricing data from a utility.

DETAILED DESCRIPTION

To facilitate an understanding of embodiments, principles, and features of the present invention, they are explained hereinafter with reference to implementation in illustrative embodiments. In particular, they are described in the context of managing and optimizing energy supply from a grid and a renewable source when charging an electric vehicle (EV) with a smart electric vehicle supply equipment (EVSE) charging station by switching between a first power source and a second power source based on a time of use or real-time energy pricing data received from a utility and optionally based on at least one of charging information and metering information. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

An electric vehicle supply equipment (EVSE) charging station is provided which is capable of switching a power source to an electric vehicle (EV) between a renewable source like solar power and a power grid on the go. The EVSE charging station interfaces with a power inverter or a storage back-up and controls flow of power to the EV and a load center. The EVSE charging station may monitor total energy consumption for the load center (interfaces with a mains meter or smart meter) and switch the power source used for charging based on a set peak demand limit for that load center. Power from the grid can be used during non-peak hours and periods when renewable (e.g., solar) power is unavailable. The EVSE charging station can also gather metering information from each circuit branch or multiple loads on the load center and use this information to determine the power source for the EV. The EVSE charging station is grid compatible and reports the power data including solar/renewable power generated, and power consumed by the load center to the user and/or utility.

An electric vehicle supply equipment (EVSE) charging station may be accessible from remote web-connected computers, smart phones or tablets in order. Furthermore, the system also allows utilities to offer programs that help manage the time and level of EV charging across the grid to increase grid reliability and efficiency while minimizing peak demand. Intelligence in EV charging stations means homeowners can reduce the cost of charging by charging during low energy rate periods, where such programs are available. Utilities can shift loads off critical peak periods to avoid the need for new generation sources. By using an EVSE server, utilities can offer rate programs to EV owners to allow the consumer to charge at highly attractive rates while simultaneously allowing the utility to manage the loads on the grid. By shifting each EV charging event slightly in time, utilities can potentially reduce the peak demand on the grid, which in turn helps to reduce the total amount of generation needed.

In one embodiment, a user preference is set to select one power source from the first and second power sources. And the EVSE charging station is configured to use the selected power source first for a charging session and switch to the second power source only when the first power source is unavailable. In one embodiment, power usage information of the EVSE charging station and distribution among multiple power sources is communicated over a wireless communication medium to a remote server for the purpose of allowing access to a utility and a user. In one embodiment, real time data corresponding to power source selection of the EVSE charging station is communicated to other smart devices coupled to the load center or other loads capable of receiving communication wirelessly for allowing lowering or increasing a power consumed by the smart devices and other loads.

Accordingly, a smart electric vehicle charging system is described that can manage and optimize energy supply based on a time of use or real time energy pricing data. In one embodiment, a set peak demand limit of a load center is used to switch between two power sources that are used to charge an EV. In this way, an energy management solution is provided for the load center that charges an EV by utilizing a renewable power source to charge the EV in a controlled manner to optimize costs while utilizing power from the grid during inconsistent solar harvesting periods.

Figure 1:
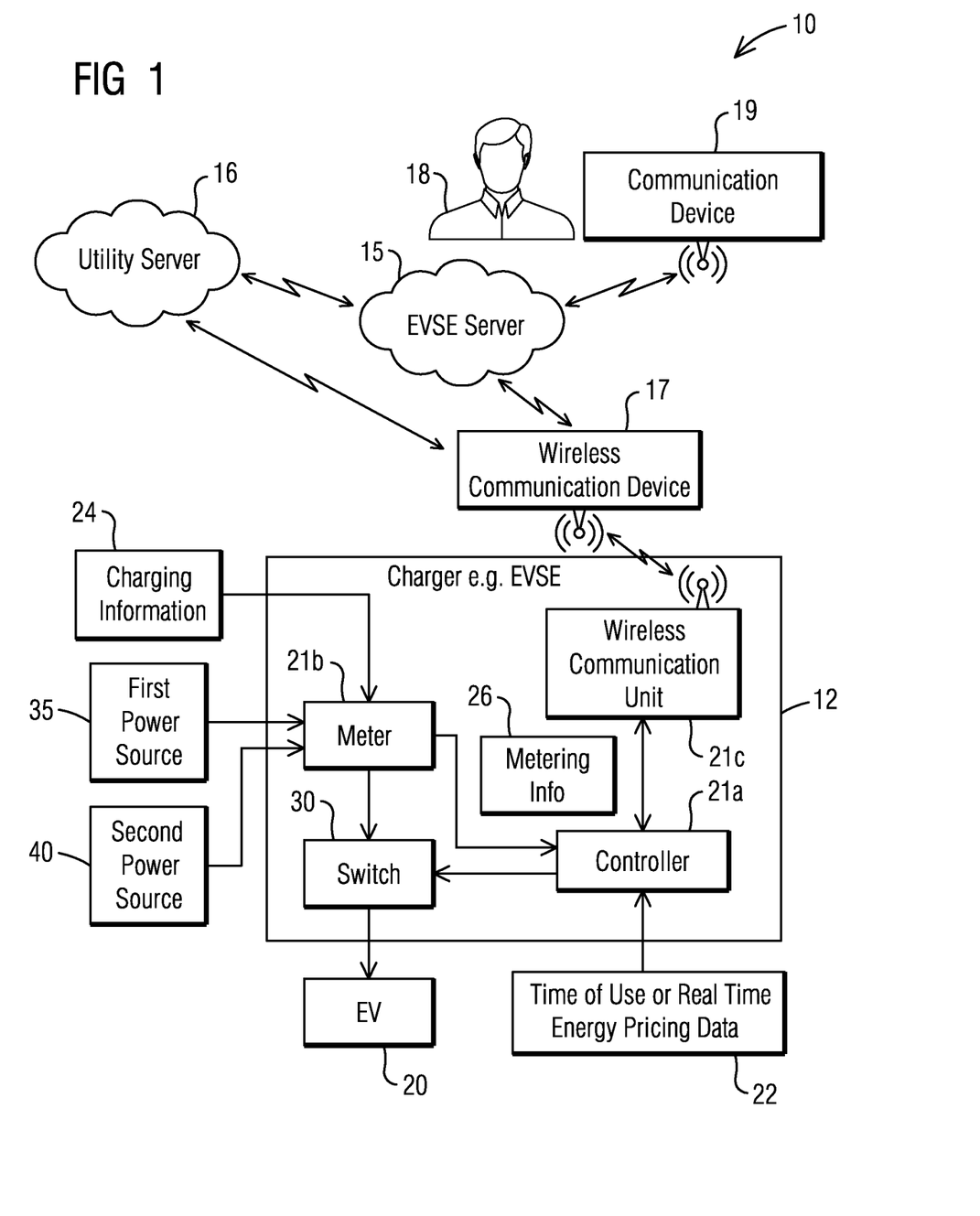
FIG. 1 illustrates a schematic diagram of an electrical supply system for charging an electric vehicle (EV) from a smart electric vehicle supply equipment (EVSE) charging station in accordance with one exemplary embodiment of the present invention.

FIG. 1 illustrates an embodiment of an electric vehicle charging system 10. The electric vehicle charging system 10 includes an electric vehicle supply equipment (EVSE) charging station 12 networked to a utility via a demand response (DR) network. The EVSE charging station 12 is configured to be coupled to an electric vehicle (EV) 20. The EVSE charging station 12 may be configured to couple to, and electrically charge, a power storage device (e.g., battery or batteries—not shown) of the EV 20. The EV 20 may be a fully-electric vehicle, as well as a hybrid vehicle. Electrical charging may be supplied to the EV 20 by the charging cable having an electrical connector (not shown) that electrically couples to a receiving connector (not shown) on the EV 20.

Embodiments of the present invention provide an intelligent vehicle charging using a networked electric vehicle (EV) or a networked electric vehicle supply equipment (EVSE) charging station. Consistent with some embodiments of the present invention, the demand response (DR)

network may enable DR deployment methods using an Automated Demand Response (ADR) client application, e.g., to provide automated demand response using OpenADR. Developed by the Demand Response Research Center (DRRC), OpenADR is a communications data model designed to facilitate sending and receiving DR signals between a utility or independent system operator (ISO) and electric customers. The data model interacts with building control systems that are pre-programmed to take action based on a DR signal, enabling a DR event to be fully automated, with no manual intervention. DR is an action taken to reduce electricity demand in response to price, monetary incentives, or utility directives so as to maintain reliable electric service or avoid high electricity prices. Participants of DR events agree under contracts with utilities to carry out various demand response control strategies to curb their electrical demand (kW) in order to gain financial benefits, which typically are received through incentives and reduction in electrical costs. Utilities may establish DR programs to: motivate changes in electric consumption by customers in response to changes in the price of electricity over time and motivate lower electricity use at times of high market prices or when grid reliability is jeopardized by providing incentive payments.

The EVSE charging station 12 may communicate with an EVSE server 15 and a utility server 16 via a wireless communication device 17 such as a modem or a wireless router in a home. The EVSE server 15 may receive charging data from, and communicate with, other smart EVSE charging stations coupled to a power grid (not shown). The EVSE server 15 as a single cloud server may be in communication with hundreds or thousands of smart EVSE charging stations like smart EVSE charging station 12. Multiple EVSE servers 15 may be provided to communicate with different areas of the power grid. The charging data that is sent periodically may be stored in memory of the EVSE server 15 and may, in some embodiments, be accessed by a user 18 via a communication device 19. In one or more embodiments, the charging data may be accessed from the EVSE server 15 by the utility server 16 and compiled to gain understanding of the amount of load being drawn in respective areas of the power grid and by what types of devices.

The EVSE charging station 12 may include a controller 21a that is operable to process a control signal (e.g., a charge signal) representative of a maximum electrical charge current to be communicated to the EV 20, and that charge signal may be received from a communication interface. The controller 21a may communicate the maximum electrical charge current that can be drawn by the EV 20 through a charge cable. The EVSE charging station 12 may receive a time of use or real time energy pricing data 22 from a utility via the utility server 16. The data 22 may indicate the time of use energy pricing data as to when the EV 20 is going to be charged during a 24 hr day-night cycle or the real time energy pricing data as the data when the EV 20 is being currently charged.

The EVSE charging station 12 may include a meter 21b that is operable to receive charging information 24, such as a current level from a sensor and/or a voltage level from a voltage tap in the EVSE charging station 12. The meter 21b which gathers metering information 26 from one or more sources such as a load center may also function to calculate one or more additional usage parameters from the metering information 26, such as charge power usage or charge energy usage from the measured values of charge current and/or charge voltage.

The EVSE charging station 12 may further include a wireless communication unit 21c. In some embodiments, the wireless communication unit 21c may be used by the smart EVSE charging station 12 to communicate charging data with the EVSE server 15. The wireless communication unit 21c may provide a gateway for communication of the smart EVSE charging station 12 with the EVSE server 15, such as through the internet. In one or more embodiments, the wireless communication unit 21c may be configured and operable to receive certain data (e.g., signal packets) from the EVSE server 15. For example, on one or more embodiments, the data received from the EVSE server 15 may concern at least one of: load control and charging routines having schedules and priorities.

The EVSE charging station 12 may further include a switch 30 for switching between a first power source 35 and a second power source 40 based on the time of use or real-time energy pricing data 22 from a utility. An example to the time of use energy pricing data may be electric energy retail price in cents/KWhr from 1 A.M. to 6 A.M. For example, 10 cents/KWhr. An example to the real time energy pricing data may be electric energy retail price in cents/KWhr at the present time, e.g., at 5 P.M. For example, 14 cents/KWhr.

The first power source 35 may be a renewable source such as a solar power plant and the second power source 40 may be a power grid. For example, a set peak demand limit for a load center (not shown) may be used as the time of use or real-time energy pricing data. The set peak demand limit may be an indication of a value of total energy consumption of the load center. Alternatively, real-time price of energy from the power grid may be used as the time of use or real-time energy pricing data. Switching to the second power source 40 is done during non-peak hours and periods when the first power source 35 is unavailable. In this way, the second power source 40 may be used during non-peak hours and periods when the first power source 35 is unavailable.

Figure 2:
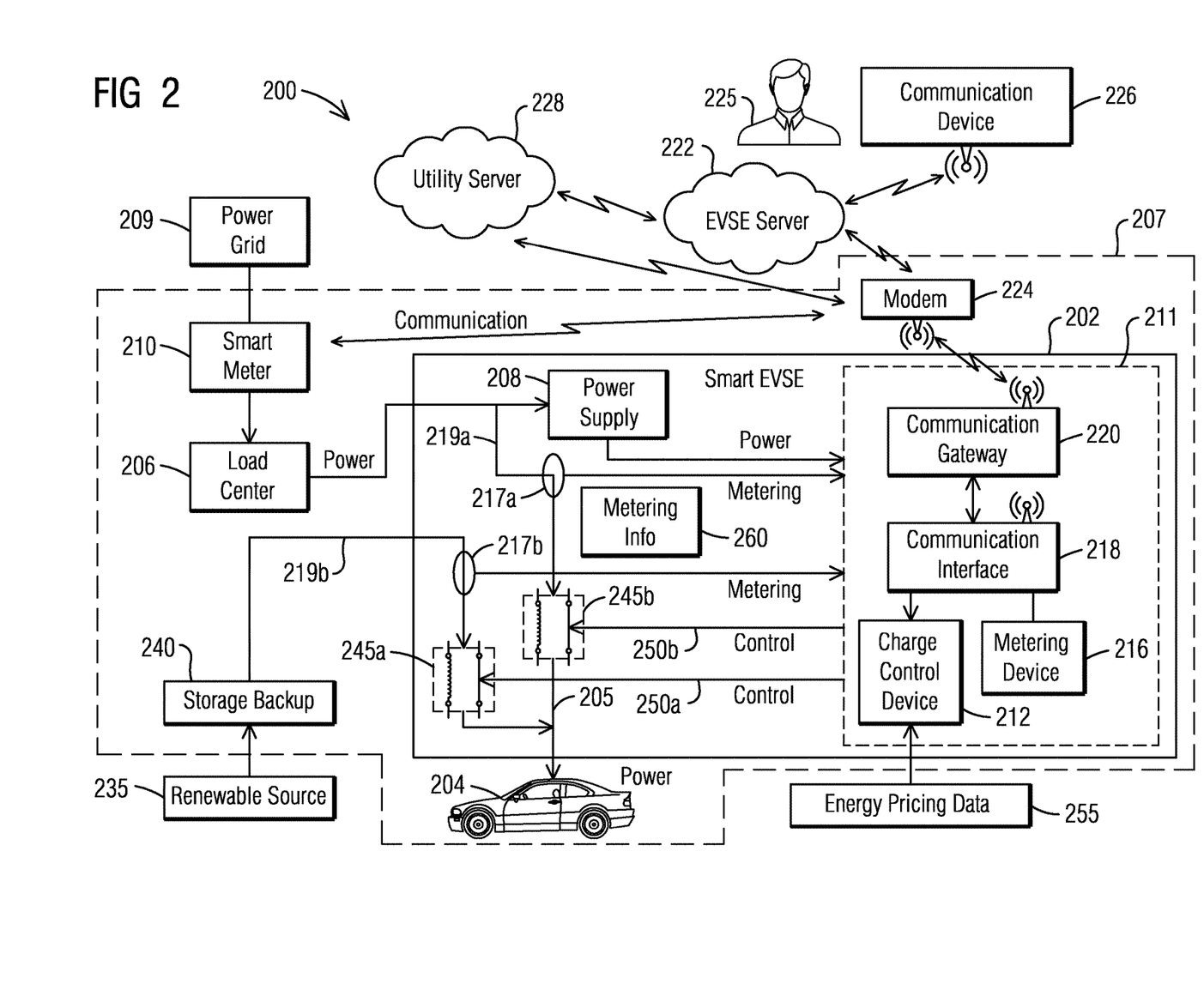
FIG. 2 illustrates a schematic diagram of an electrical supply system for charging an electric vehicle (EV) from a smart electric vehicle supply equipment (EVSE) charging station that is configured to manage and optimize energy supply from a grid and a renewable source in accordance with another embodiment of the present invention.

Referring now to FIG. 2, an embodiment of an electrical supply system 200 for an EV 204 including a smart EVSE 202 is provided. The smart EVSE 202 may be configured as a charging station. The smart EVSE 202 may be configured to couple to, and electrically charge, a power storage device (e.g., battery or batteries—shown dotted) of the EV 204. The EV 204 may be a fully-electric vehicle, as well as a hybrid vehicle. Electrical charging may be supplied to the EV 204 by a charging cable 205 having an electrical connector (not shown) that electrically couples to a receiving connector (not shown) on the EV 204.

The smart EVSE 202 may be electrically coupled to a load center 206 (e.g., a panel box including circuit breakers, or the like) of a building 207 (shown dotted). However, in some instances, the smart EVSE 202 may be outside of the building 207. The smart EVSE 202 may be coupled as an electrical load on one branch electrical circuit and may receive electrical power from the load center 206. The load center 206 may be connected to a power grid 209 via a smart meter device 210. A typical load center 206 may have a 240V, 200A service, for example. However, other load center types and sizes may be used for supplying the smart EVSE 202. Other electrical branch circuits containing one or more electrical loads may also be coupled to the load center 206. Any suitable number of branch circuits may be connected based upon the rating and size of the load center 206. One or more of the branch circuits may also couple to and include one or more subpanels. As will be apparent from the following, in some embodiments, one or more of these electrical loads may be devices (e.g., appliances, lighting, heating, HVAC, windows and doors, outlets, and the like).

The smart EVSE 202 may further include a power supply 208 configured to provide electrical power sufficient for the various control, metering, processing, and communication components of the smart EVSE 202, to be described later herein. Power supply 208 may be a 240V, 100 mA power supply, for example. Other suitable types and sizes of power supply 208 may be used. The smart EVSE 202 may include a printed circuit board 211 (shown dotted) including multiple interconnected microprocessors, electrical circuits, and components thereon.

The power supply 208 may be coupled to the load center 206, which is in turn coupled to the smart meter device 210. The smart meter device 210 is coupled to the load center 206 to provide electricity to the smart EVSE 202. The smart meter device 210 may include a communication capability adapted to communicate with the smart EVSE 202. The smart meter device 210 may be coupled to the power grid 209. The smart EVSE 202 is configured to interface with the smart meter device 210 to obtain a total power value.

In the depicted embodiment, the smart EVSE 202 may include a charge control device 212 that is operable to process a control signal (e.g., a charge signal) representative of a maximum electrical charge current to be communicated to the EV 204, and that charge signal may be received from a communication interface. The charge control device 212 may communicate the maximum electrical charge current that can be drawn by the EV 204 through charge cable 205. Charge control device 212 may also open and close a contactor under certain conditions, such as when a pause or delay charge request is received or when a scheduling request or control signal of a demand request from a user or utility server is received. Contactor may electrically couple to charging cable 205, which may include a SAE J1772 connector, or the like that is coupled to the EV 204. Contactor may be a 2-pole or 4-pole type. Charge control device 212 includes a low-power microcontroller that controls the contactor based on a state of or user request to the smart EVSE 202. It also communicates information concerning the EVSE 102 to the user via the communication interface 218.

The smart EVSE 202 may include a metering device 216 that is operable to receive charging information, such as from a sensor on the charging cable 205 and/or a voltage tap on the power supply 208 in the smart EVSE 202. The metering device 216 may also be operable to receive charging information, such as from a first sensor 217a on a first supply cable 219a and a second sensor 217b on a second supply cable 219b. In one or more embodiments, the first and second sensors 217a, 217b may be a current transformer, for example, and may provide to the metering device 216 a measure of electrical current drawn by the EV 204. Each sensor 217a, 217b may be a single sensor or a combination of sensors able to measure charging current and the voltage tap may be able to measure charging voltage. In one or more embodiments, a measure of voltage may be provided to the metering device 216 from voltage tap, which may be a stepped-down voltage measure from the power supply 208. The metering device 216 may then calculate one or more of charge current or charge voltage, for example.

The metering device 216 may also function to calculate one or more additional usage parameters, such as charge power usage or charge energy usage, such as from the measured values of charge current and/or charge voltage. The metering device 216 may be a system on chip (SoC), which is an integrated circuit (IC) that may integrate all components of a computer or other electronic system into a single chip. It may contain digital, analog, mixed-signal, and even radio-frequency functions, and memory all on a single chip substrate. In particular, the metering device 216 may be an 8051 microcontroller in some embodiments. Other suitable microcontrollers may be used. Charging data such as one or more of charge current, charge voltage, charge power usage, charge energy usage, and combinations of the foregoing may be stored in memory of the metering device 216 and one or more of these may be communicated periodically from the smart EVSE 202. Communication may be performed in periodic intervals, such as about every 30 seconds for example. Other intervals may be used.

The smart EVSE 202 may include a communication interface 218 that is configured and functional to allow internal communication between the various other EVSE components, such as the other microcontrollers (e.g., the charge control device 212, the metering device 216, and a communication gateway 220). For example, the communication interface 218 may facilitate data communication between the metering device 216 and the communication gateway 220. Communication may include transmission and communication of charging data such as one or more of charge current, charge voltage, charge power, charge energy, or combinations of the foregoing from the metering device 216 to the communication gateway 220. Communication packets may be sent in incremental periods, as discussed above. Likewise, in some instances, maximum charge current to be drawn by the EV 204 may be communicated as a control signal by the communication gateway 220 to the charge control device 212. Communication interface 218 may be a 32-bit processor, such as an ARM® CORTEX®-M3 processor or the like. Other suitable processor types may be used.

The communication interface 218 may communicate with the other devices of the smart EVSE 202 (e.g., the charge control device 212, the metering device 216 and the communication gateway 220) via one or more modular communications interface (MCI) such as specified by ANSI/CEA-2045, for example. Other communication protocols may be used. Communication between the communication interface 218 and the metering device 216 may be by serial communication or the like by use of one or more universal asynchronous receiver-transmitters (UART), which is a computer component that handles asynchronous serial communication. Communication between the communication interface 218 and the communication gateway 220 and between the communication interface 218 and the charge control device 212 may be by Serial Peripheral Interface (SPI). SPI is a synchronous serial communication interface specification used for short distance communication. Other forms of inter-component electronic communication may be used.

The communication gateway 220 provides a gateway for communication of the smart EVSE 202 with an EVSE server 222, such as through the internet. The EVSE server 222 may be a cloud server accessed by a user 225 of the smart EVSE 202 via a communication device 226. The EVSE Server 222 may be based on Microsoft® C-sharp programming, for example. The EVSE server 222 may include a large data table including data on the smart EVSE 202 and the user 225, including charge data and control signals with timestamps, priority data, schedules, access keys, user IDs, e-mails, and passwords. Data table may also include load information concerning load data for smart devices coupled to the load center 206.

The communication gateway 220 may, in some embodiments, allow wireless communication over a wireless local area network (WLAN), such as with the use of an internet communication device 224, such as a MODEM. The internet communication device 224 may communicate using Wi-Fi based on the IEEE 802.11 standard, BLUETOOTH, or other suitable wireless communication protocols. In some embodiments, the internet communication device 224 may interface with a local router (not shown), which may be a wireless router, to allow operation of the wireless communication protocol. In some embodiments, a wireless router function and modem capability may be integrated into a hybrid device. The internet communication device 224 may be any suitable communication device configured to allow access to the internet, such as through cable (cable modem), or through optical fiber (fiber-optic modem), for example. Other types of internet access may be provided.

In some embodiments, the communication capability with the EVSE server 222 may be through the internet as accessed by 3G or 4G or any other mobile communications standard that allows cell phones, computers, and other portable electronic devices to access the Internet wirelessly, for example. In this instance the internet communication device 224 may be integrated into the communication gateway 220, rather than being a separate device.

The communication gateway 220, which is integral in the smart EVSE 202, may allow for two-way communication with the internet communication device 224 over a WLAN, in some embodiments. As discussed above, the communication gateway 220 may be used to communicate with the EVSE server 222 through the internet communication device 224 such that signal packets that may be communicated to and from the smart EVSE 202. Data packets may be communicated to the EVSE server 222 and control packets may be received from the EVSE server 222.

In some embodiments, the communication gateway 220 may be used to communicate charging data with the EVSE server 222. The EVSE server 222 may receive charging data from, and communicate with, other smart EVSEs coupled to the power grid 209. A single EVSE server 222 may be communication with hundreds or thousands of smart EVSEs like smart EVSE 202. Multiple EVSE servers 222 may be provided to communicate with different areas of the power grid 209. The charging data that is sent periodically may be stored in memory of the EVSE server 222 and may, in some embodiments, be accessed by the user 225 via a communication device 226.

The communication device 226 may be a mobile device such as a cell phone, tablet, phablet, or the like that is capable to access the EVSE server 222, such as by using a mobile communication standard such as 3G, 4G, or the like. The user 225 may operate an application (hereinafter "app") that is downloaded to the communication device 226. The App may be written in JavaScript using a framework such as Apache Cordova™ or an object-oriented language such as Objective-C for OS X and iOS for Apple.

Using the App, the user 225 may access the charging data. Charging data may include one or more of charge voltage, charge current drawn by the EV 204, charge power consumed by the smart EVSE 202 in carrying out the charging of the EV 204, and/or charge energy consumed by the smart EVSE 202. Electrical rate information may also be accessed using the App. Furthermore, in some embodiments, the user 225 may operate the smart EVSE 102 through control signals communicated through the EVSE server 222 to the smart EVSE 202. User 125 may receive through the App demand response requests (an event).

In one or more embodiments, the charging data may be accessed from the EVSE server 222 by a utility server 228 and compiled to gain understanding of the amount of load being drawn in respective areas of the power grid 209 and by what types of devices. In one or more embodiments, the communication gateway 220 may be configured and operable to receive certain data (e.g., signal packets) from the EVSE server 222. For example, on one or more embodiments, the data received from the EVSE server 222 may concern at least one of: load control, charging schedules, and charging priorities.

A renewable source 235 may be provided to supply power to the EV 204 for charging it when charging from the power grid 209 would be too expensive. The renewable source 235 may be coupled to a storage backup 240 to feed power to a first switch 245a. A first control signal 250a may control the first switch 245a. The charge control device 212 may supply the first control signal 250a based on energy pricing data 255. The load center 206 may provide power from the power grid 209 to a second switch 245b. A second control signal 250b may control the second switch 245b. The charge control device 212 may supply the second control signal 250b based on the energy pricing data 255.

In one embodiment, the energy pricing data 255 is a set peak demand limit for the load center 206. The set peak demand limit may be an indication of a value of total energy consumption of the load center 206. The peak demand limit may be established by a do not exceed energy demand limit value to keep the energy demand of the load center 206 and the EV 204 at or below the peak demand limit.

Consistent with an illustrative embodiment of the present invention, the smart EVSE 202 is configured to monitor the total energy consumption of the load center 206 and switch a power source between the renewable source 235 and the power grid 209 based on the set peak demand limit. The load center 206 may include a plurality of loads each having a circuit branch. The smart EVSE 202 is configured to gather metering information 260 from each circuit branch of the plurality of loads and determine a power source between the renewable source 235 and the power grid 209 based on the metering information 260.

The smart EVSE 202 may be configured to report to at least one of a user and a utility power data including renewable power generated by the renewable source 235 and power consumed by the load center 206. The smart EVSE 202 may be configured to monitor and measure power used by the EV 204 from the renewable source 235 and power used by the EV 204 from the power grid 209. The smart EVSE 202 may be configured to control a flow of renewable power between the power grid 209, the EV 204 and any loads on the load center 206. The smart EVSE 202 may be configured to interface with branch circuit meters or any loads of the load center 206 to obtain the metering information 260 and change a power source between the renewable source 235 and the power grid 209 based on the metering information 260.

The smart EVSE 202 may be configured to monitor total renewable power used data to charge the battery of the EV 204 and any loads of the load center 206 and renewable power fed back to the power grid data and provide the total renewable power used data and the renewable power fed back to the power grid data to at least one of a user and a utility. The smart EVSE 202 may be configured to enable charging of the battery of the EV 204 from the renewable source 235 based on a request from a user.

Figure 3:
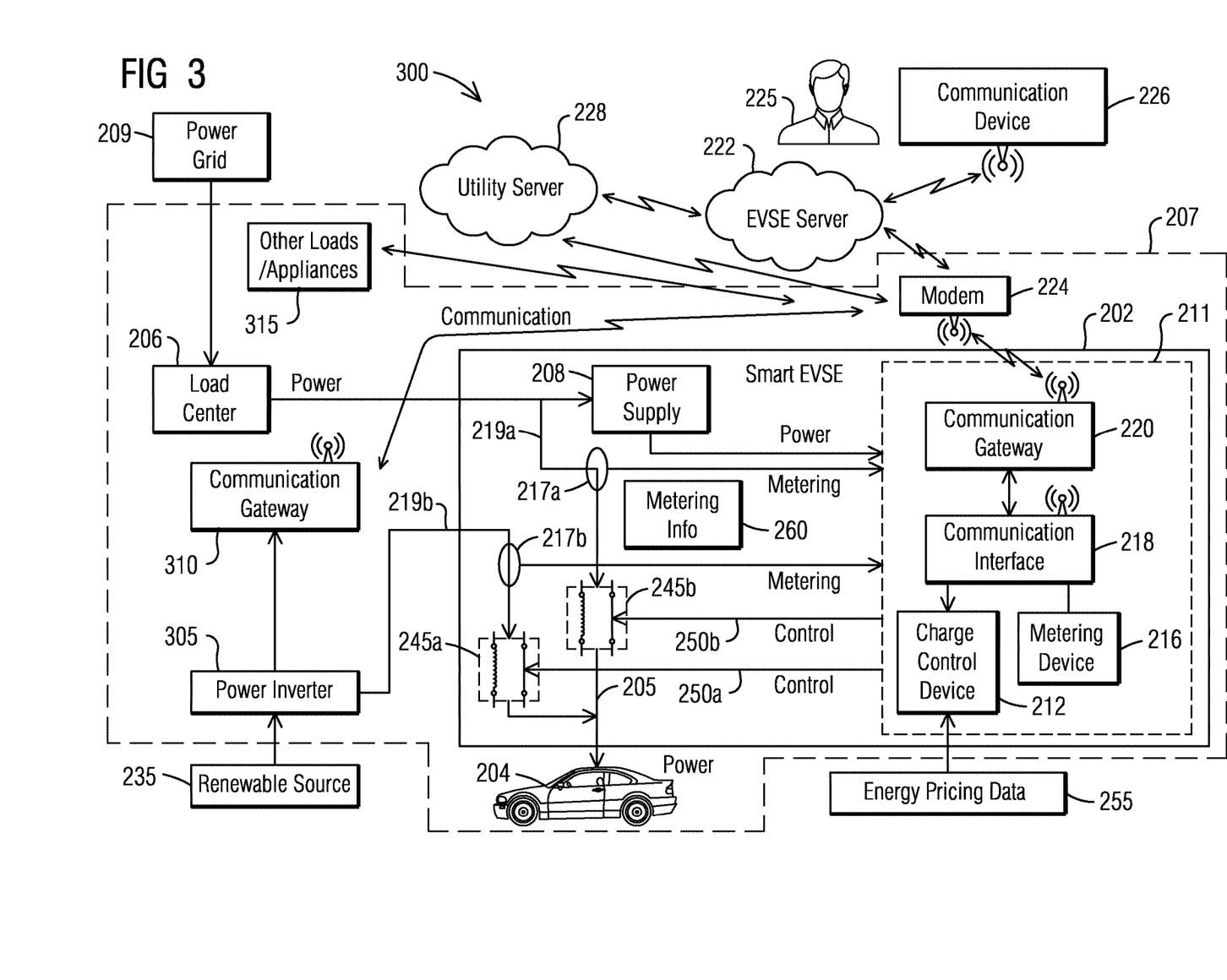
FIG. 3 illustrates a schematic diagram of an electrical supply system for charging an electric vehicle (EV) from a smart electric vehicle supply equipment (EVSE) charging station that is configured to manage and optimize energy supply from a grid and a renewable source in accordance with yet another embodiment of the present invention.

FIG. 3 illustrates a schematic diagram of an electrical supply system 300 for charging the electric vehicle (EV) 204 from the smart electric vehicle supply equipment (EVSE) 202 in accordance with yet another embodiment of the present invention. The smart EVSE 202 is configured to manage and optimize energy supply to the EV 204 from the power grid 209 and the renewable source 235.

The renewable source 235 may be provided to supply power to the EV 204 for charging it when charging from the power grid 209 would be too expensive. The renewable source 235 may be coupled to a power inverter 305. The power inverter 305 may be coupled to a communication gateway 310 which may be configured to communicate to the internet communication device 224. In some embodiments, one or more of electrical loads 315 as smart devices (e.g., smart appliances, smart lighting, smart heating, smart HVAC, smart windows and doors, smart outlets, and the like) may be coupled. The term "smart device" as used herein means any electrical device that may be remotely monitored and/or remotely controlled via a communication network. The electrical loads 315 may be configured to communicate to the internet communication device 224. The smart EVSE 202 is configured to interface with the power inverter 305 connected to the renewable source 235 to charge the battery of the EV 204. The smart EVSE 202 is configured to interface with the power inverter 305 through the communication gateway 310 to obtain total renewable power generated and receive status data.

Figure 4:
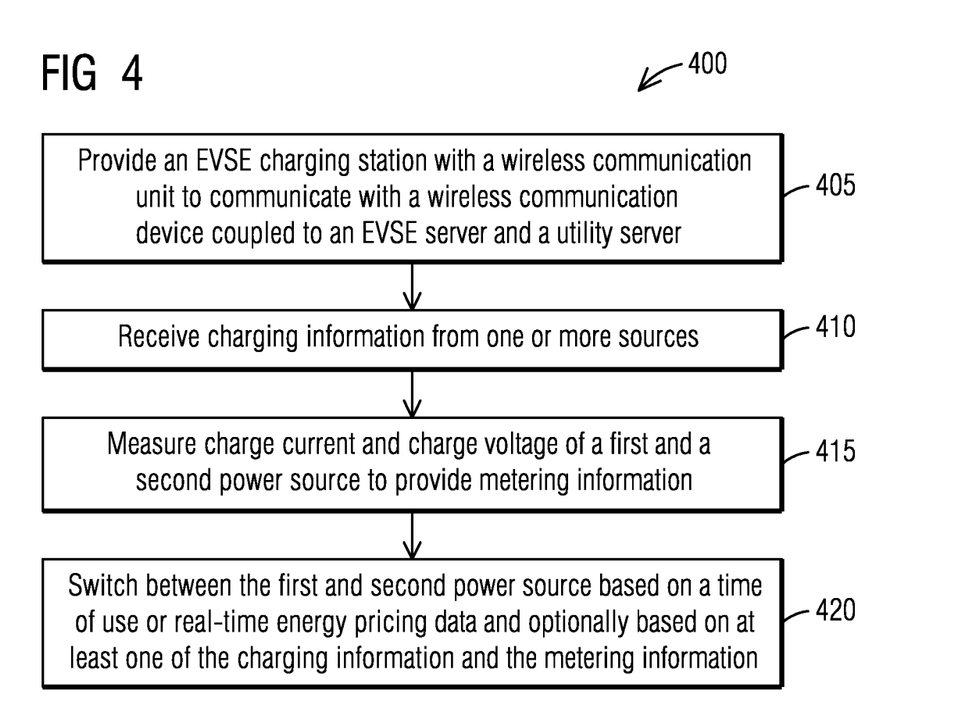
FIG. 4 illustrates a flow chart of a method for managing and optimizing energy supply from a grid and a renewable source when charging an electric vehicle (EV) with a smart electric vehicle supply equipment (EVSE) charging station in accordance with an exemplary embodiment of the present invention.

FIG. 4 illustrates a flow chart of a method 400 for managing and optimizing energy supply from the power grid 209 and the renewable source 235 when charging the electric vehicle (EV) 204 with the smart electric vehicle supply equipment (EVSE) 202 in accordance with an exemplary embodiment of the present invention. Reference is made to the elements and features described in FIGS. 1-3. It should be appreciated that some steps are not required to be performed in any particular order, and that some steps are optional.

In step 405, the EVSE charging station 12 (or the smart EVSE 202) is provided and it is configured to wirelessly communicate with the EVSE server 15 and the utility server 16 via the wireless communication device 17. The EVSE charging station 12 may include the meter 21b which may receive charging information 24 in step 410. Examples of the charging information 24 are a current level from a sensor and/or a voltage level from a voltage tap in the EVSE charging station 12. The meter 21b may gather metering information 26 from one or more sources such as a load center.

At step 415, the meter 21b may measure values of charge current and/or charge voltage as metering information being part of the metering information 26 to calculate one or more additional usage parameters from the metering information, such as charge power usage or charge energy usage. In step 420, the switch may switch a power source between the renewable source 35 and the power grid 209 based on the time of use or real-time energy pricing data 22 from a utility and optionally based on at least one of the charging information 24 and the metering information 26.

Figure 5:
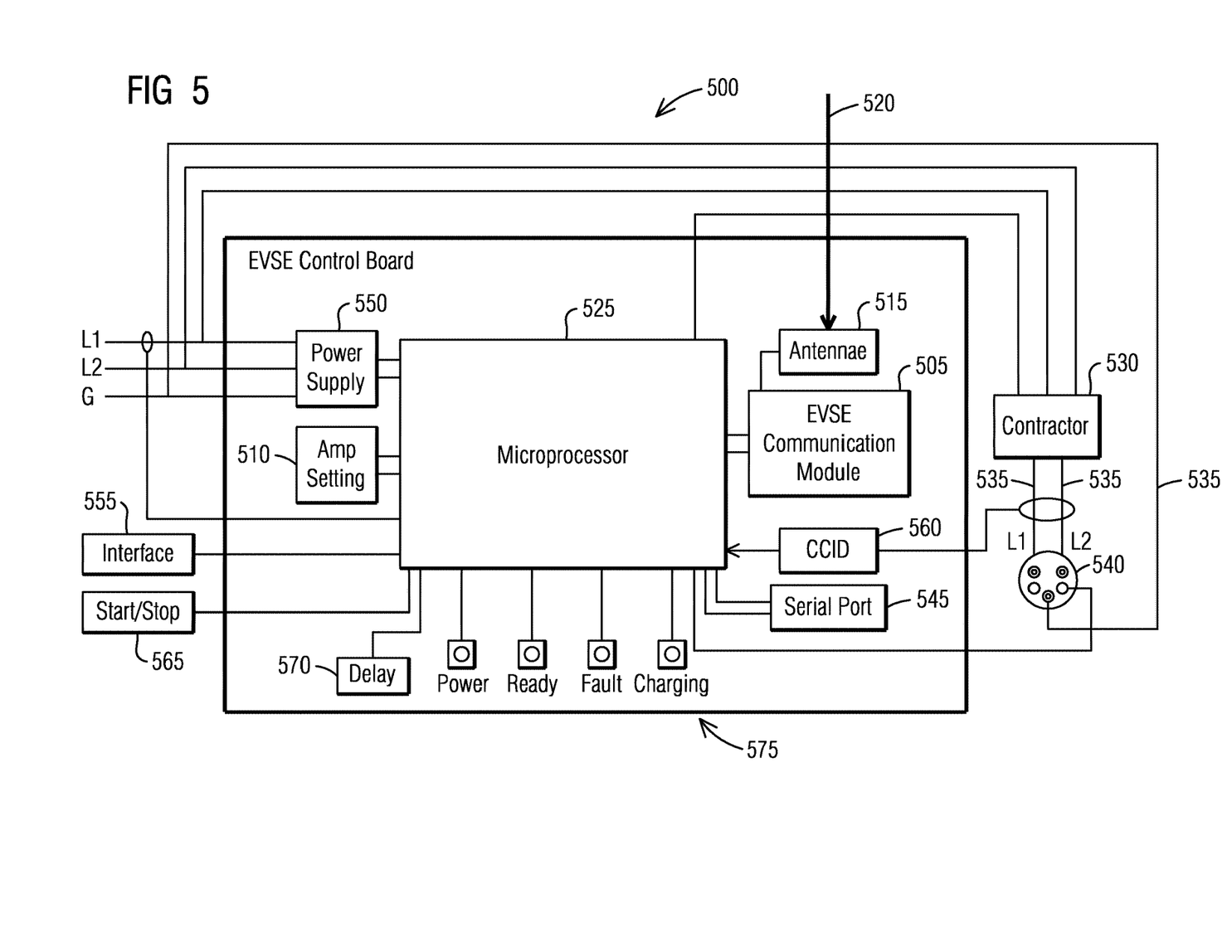
FIG. 5 illustrates an electrical block diagram of the electric vehicle supply equipment (EVSE) charging station of FIGS. 1 and 2 in accordance with an exemplary embodiment of the present invention.

FIG. 5 illustrates an electrical block diagram of the electric vehicle supply equipment (EVSE) charging station 12 of FIGS. 1, 2 and 3 in accordance with an exemplary embodiment of the present invention. An EVSE charging station 500 includes a communication module 505. For example, the communication module 505 may be a wireless communication module. However, it should be recognized that the communication module 505 of the EVSE charging station 500 may be a PLC if the communication is wired. The EVSE charging station 500 may also include an amperage setting switch 510 that functions to further limit the maximum amperage that the EV 20 can request from a load center.

An antenna 515 connected to the communication module 505 is adapted to receive a wireless signal 520 from other communication module. The received signal 520 is indicative of a maximum charge output setting for the EVSE charging station 500. A microprocessor 525 then sets a maximum amperage output for the ESVE charging station 500 by communicating this maximum amperage setting to the EVSE charging station 500 via industry standard protocol SAE J1772. A contactor 530 is connected to a charge cable 535, which terminates at an EVSE connector 540. The EVSE connector 540 may be a SAE J1772 connector and is adapted to couple to a receiving connector on the EV 20 (FIG. 1). The ESVE charging station 500 may further include a serial port 545, such as a differential serial port RS485 for data communication, suitable power supply and conditioning 550, a user interface 555 for user input to the EVSE charging station 5003, a Circuit Card Interface Device (CCID) 560 to provide feedback information about the level of charge, a start/stop button 565, a delay 570 to enable delayed charging for an amount of delay time, and other indicators 575 adapted to indicate whether the EVSE charging station 500 is powered, ready, in a fault condition, or is charging.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An electrical supply system for an electric vehicle (EV), the system comprising:
an electric vehicle supply equipment (EVSE) charging station including a meter, a switch, a controller and a wireless communication unit, the EVSE charging station configured to couple to the EV for electrically charging a battery of the EV, the wireless communication unit is configured to communicate with a wireless communication device that is configured to communicate with a EVSE server and a utility server, the EVSE server is configured to communicate with a user communication device,
wherein the meter is operable to receive charging information from one or more sources and provide metering information of a first power source and a second power source by measuring values of at least one of charge current and charge voltage and calculate one or more energy usage parameters including charge power usage or charge energy usage from the measured values of charge current and/or charge voltage,
wherein the switch is configured to couple to the first power source and the second power source, the first power source to receive energy from a renewable power source to charge the battery of the EV and the second power source to receive energy from a power grid to charge the battery of the EV, the switch is operable to switch between the first power source and the second power source,
wherein the controller is configured to control the switch by switching between the first power source and the second power source based on a time of use or real-time energy pricing data from a utility and based on the charging information from one or more sources and the metering information associated with the first power source and the second power source,
wherein the second power source is used during selected hours and periods when the first power source is unavailable,
wherein the time of use or real-time energy pricing data is a set peak demand limit for a load center, wherein the set peak demand limit is established by a do not exceed energy demand limit value to keep the energy demand of the load center and the EV at or below the set peak demand limit, wherein the EVSE charging station is configured to monitor and measure power used by the EV from the first power source and power used by the EV from the second power source, wherein the EVSE charging station is configured to control a flow of renewable power between the power grid, the EV and any loads on the load center, and wherein the EVSE charging station is configured to communicate real time data corresponding to power source selection of the EVSE charging station to other smart devices coupled to the load center or other loads capable of receiving communication wirelessly for allowing lowering or increasing a power consumed by the smart devices and other loads.

2. The system of claim 1, wherein the EVSE charging station is configured to monitor the total energy consumption of the load center and switch a power source between the first and second power sources based on the set peak demand limit.

3. The system of claim 1, further comprising:
a smart meter device including a communication capability adapted to communicate with the EVSE charging station, the smart meter device coupled to the power grid; and
a power supplier coupled to a load center, the load center coupled to the EVSE charging station, the smart meter device coupled to the load center to provide electricity to the EVSE charging station,
wherein the load center includes a plurality of loads each having a circuit branch, the EVSE charging station is configured to gather metering information from each circuit branch of the plurality of loads and determine a power source between the first and second power sources based on the metering information.

4. The system of claim 3, wherein the EVSE charging station is configured to interface with the smart meter device to obtain a total power value.

5. The system of claim 1, wherein the EVSE charging station is configured to report to at least one of a user and a utility power data including renewable power generated by the first power source and power consumed by the load center.

6. The system of claim 1, wherein the EVSE charging station is configured to interface with a power inverter connected to the first power source to charge the battery of the EV.

7. The system of claim 1, wherein the EVSE charging station is configured to interface with a power inverter through a communication gateway to obtain total renewable power generated and receive status data.

8. The system of claim 1, wherein the EVSE charging station is configured to interface with branch circuit meters or any loads of a load center to obtain metering information and change a power source between the first and second power sources based on the metering information.

9. The system of claim 1, wherein the EVSE charging station is configured to monitor total renewable power used data to charge the battery of the EV and any loads of a load center and renewable power fed back to the power grid data and provide the total renewable power used data and the renewable power fed back to the power grid data to at least one of a user and a utility.

10. The system of claim 1, wherein the EVSE charging station is configured to enable charging of the battery of the EV from the first power source based on a request from a user.

11. The system of claim 1, wherein the time of use or real-time energy pricing data is a real-time price of energy from the power grid.

12. A method of supplying power to an electric vehicle (EV), the method comprising:
providing an electric vehicle supply equipment (EVSE) charging station for electrically charging a battery of the EV;
coupling a switch to a first power source and a second power source, the first power source to receive energy from a renewable power source to charge the battery of the EV and the second power source to receive energy from a power grid to charge the battery of the EV;
providing electricity to the EVSE charging station from a load center, a power supplier coupled to the load center, the load center coupled to the EVSE charging station, a smart meter device coupled to the load center, wherein the smart meter device including a communication capability adapted to communicate with the EVSE charging station, the smart meter device coupled to the power grid;
controlling the switch for switching between the first power source and the second power source based on a time of use or real-time energy pricing data from a utility and based on the charging information from one or more sources and the metering information associated with the first power source and the second power source;
switching to the second power source during selected hours and periods when the first power source is unavailable;
using a set peak demand limit for the load center as the time of use or real-time energy pricing data;
establishing the set peak demand limit by a do not exceed energy demand limit value to keep the energy demand of the load center and the EV at or below the set peak demand limit;
monitoring and measuring power used by the EV from the first power source and power used by the EV from the second power source;
controlling a flow of renewable power between the power grid, the EV and any loads on the load center; and
communicating real time data corresponding to power source selection of the EVSE charging station to other smart devices coupled to the load center or other loads capable of receiving communication wirelessly for allowing lowering or increasing a power consumed by the smart devices and other loads.

13. The method of claim 12, further comprising:
using a real-time price of energy from the power grid as the time of use or real-time energy pricing data.

14. The method of claim 12, further comprising:
communicating power usage information of the EVSE charging station and distribution of power usage among multiple power sources over a wireless communication medium to a remote server for the purpose of allowing access to a utility and a user.

15. The system of claim 1, wherein a set peak demand limit of a load center is used to switch between the first and second power sources that are used to charge the EV.

16. The system of claim 1, wherein an energy management solution is provided for a load center that charges the EV by utilizing the renewable power source to charge the EV in a controlled manner to optimize costs while utilizing power from the power grid during inconsistent solar harvesting periods.

* * * * *